Feb. 5, 1957 L. J. LAULER ET AL 2,780,800
REMOTE INDICATOR FOR SCALES
Filed June 11, 1952 3 Sheets-Sheet 1

INVENTORS
Louis J. Lauler
Matthew T. Thorsson
BY
Paul L. Koolen
ATTY.

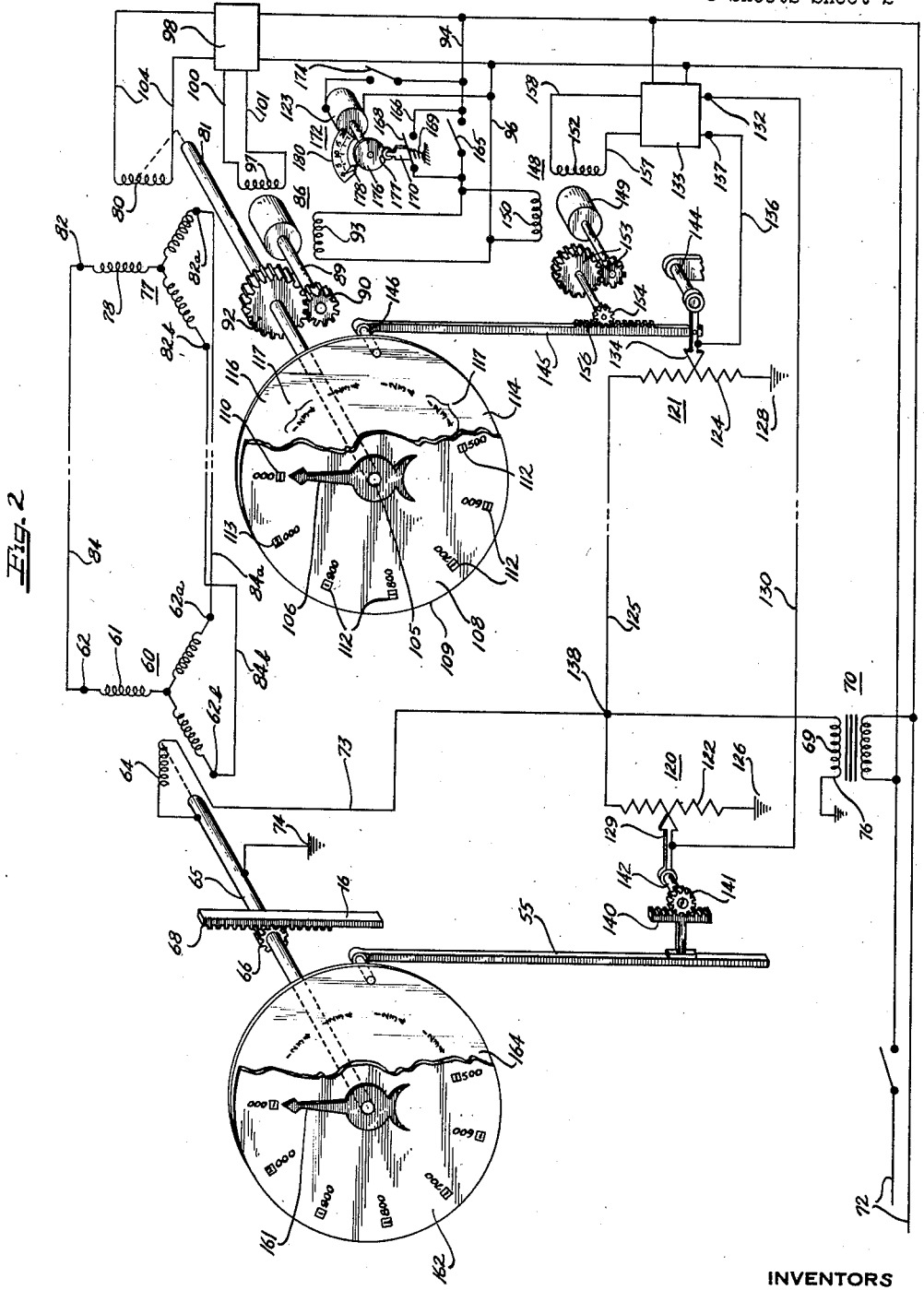

Feb. 5, 1957   L. J. LAULER ET AL   2,780,800
REMOTE INDICATOR FOR SCALES
Filed June 11, 1952   3 Sheets-Sheet 3
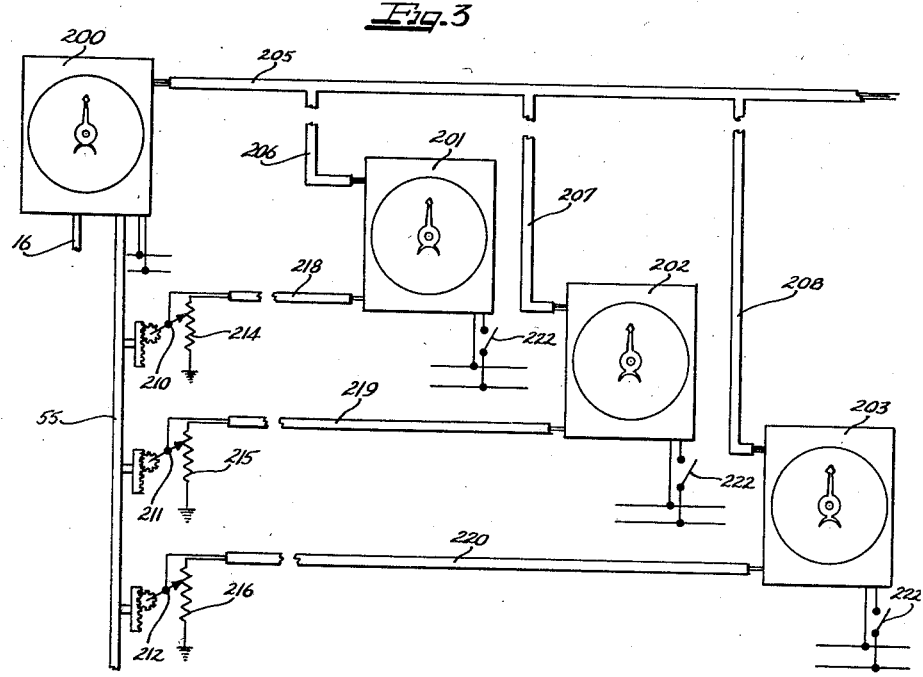
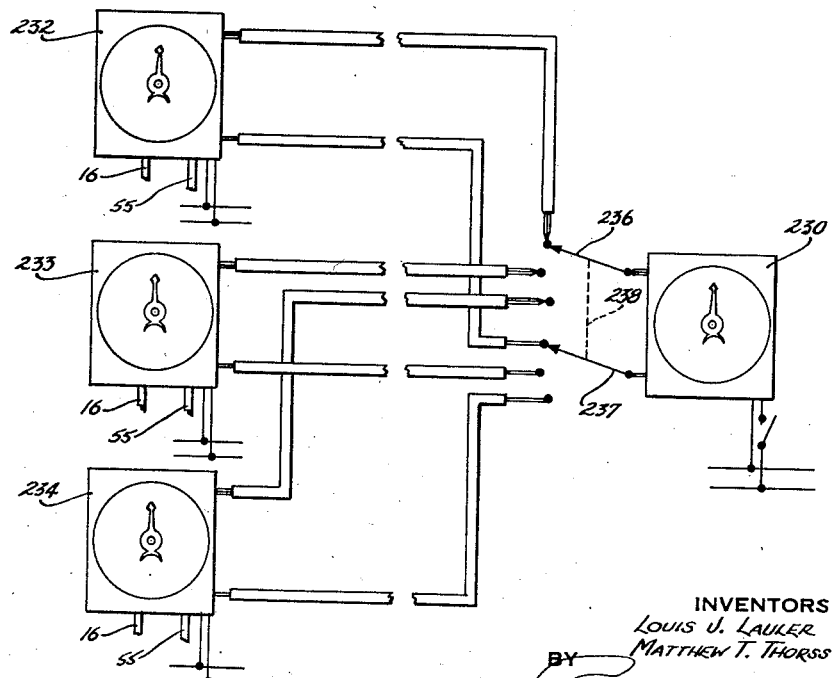
INVENTORS
LOUIS J. LAULER
MATTHEW T. THORSSON
BY Paul L. Kislov
ATTY.

United States Patent Office 2,780,800
Patented Feb. 5, 1957

2,780,800
REMOTE INDICATOR FOR SCALES

Louis J. Lauler and Matthew T. Thorsson, Rock Island, Ill., assignors to Fairbanks, Morse & Co., Chicago, Ill., a corporation of Illinois Application June 11, 1952, Serial No. 292,892

15 Claims. (Cl. 340—187)

This invention relates to condition indicating means, and more particularly to a highly effective and accurate indicator system of electrical character, suitable for application to weighing apparatus such as to afford weight indication at a point relatively remote from the weighing apparatus.

While the indicator system of the present invention may be readily applied to measuring instruments for various purposes, as apparatus for measuring temperature, determining physical characteristics of objects, etc., it is especially suitable for use with weighing apparatus or scales of variable capacity types to provide accurate indication at a point remote from the scale, of scale load weights in any selected load capacity range of the scale. As is well understood, conventional forms of mechanical dial scales are inherently subject to certain difficulties and disadvantages in providing remote indication of scale load weights by mechanical transmissions to the remote indicator. High among such disadvantages is friction in the transmission between the scale beam and remote indicator, which results in functional errors in the weighing mechanism.

Added difficulties are encountered in adapting the remote indicator to variable capacity scales, such as prevailing mechanical dial scales with selectively applied drop-weights for changing the scale capacity. Mechanical transmission of drop-weight addition or subtraction to a corresponding weight indicating adjustment of the remote indicator mechanism, is in general impractical, and particularly so in instances where the remote indicator is located considerably distant from the scale. In the latter case, transmission actuating power requirements would be relatively large, dependent in part upon the length of the transmission linkage and any extension thereof required to avoid interfering obstructions between the scale station and the remote indicator station. Remote indicator range adaptation to a drop-weight scale may be attained without mechanical adjustment transmission means, by employing an electrical system providing drop-weight information at the remote station, through appropriate indicator signals as colored lights indicating the number of drop-weights applied to or removed from the scale beam. However, such provision involves the human element, with attendant possibilities of error not only in proper interpretation of the light or other signals, but in applying the drop-weight factors indicated thereby, to conversion of the remote weight reading to the correct weight value of the scale load under measurement.

With the foregoing in view, it is the principal object of the present invention to provide an electrical remote indicator system especially suitable for application to a variable capacity or drop-weight scale mechanism, which fully avoids the disadvantages and difficulties hereinabove referred to, and which may be readily applied in selected combinations such for example, as to afford from a single scale, weight indications at a plurality of remote stations either selectively at one or more thereof or simultaneously at all such stations, or to provide at a single remote station, weight indications selectively from any one of a plurality of scales.

Another object is to provide in operative association with variable capacity scale mechanism such as of a drop-weight type, an electrical system including a remote indicator device adjustable for indicating scale load weights in any drop-weight determined weighing range of the scale, electrical network controlled means responsive to drop-weight variation of scale capacity, for effecting corresponding adjustments of the indicator device, and electrical operating means for translating load response of the scale to load weight indication by the remote indicator device.

Another object is to provide an electrical remote indicator system of the character above indicated, embodying control provisions for holding or retaining the remote indicator in any actuated, weight indicating condition for an indefinite period of time, the provisions including selectively operable automatic timing means of settable character, for effecting such held condition of the remote indicator at the end of any selected time period within the range of the timing means.

Other objects and advantages of the present invention will appear from the following description of a presently preferred embodiment thereof, as exemplified in the accompanying drawings, wherein:

Fig. 1 is a diagrammatic view of the remote indicator, illustrated in operative association with the scale beam and capacity determining drop-weight portions of a variable capacity scale, the latter structure being shown in somewhat schematic manner.

Fig. 2 provides a circuit diagram of the electrical remote indicator system, the view including a partly diagrammatic illustration of the remote indicator device adjustable to correspondence with drop-weight determined capacity ranges of the scale, and the similar indicator device which may be provided in proximate association with the scale.

Fig. 3 illustrates diagrammatically, an arrangement of a plurality of remote indicators for providing at different remote points, weight indication from a single scale.

Fig. 4 illustrates diagrammatically, a remote indicator arrangement wherein one remote indicator may be utilized for remote weight indication selectively with respect to any one of a plurality of scales.

Figure 1:
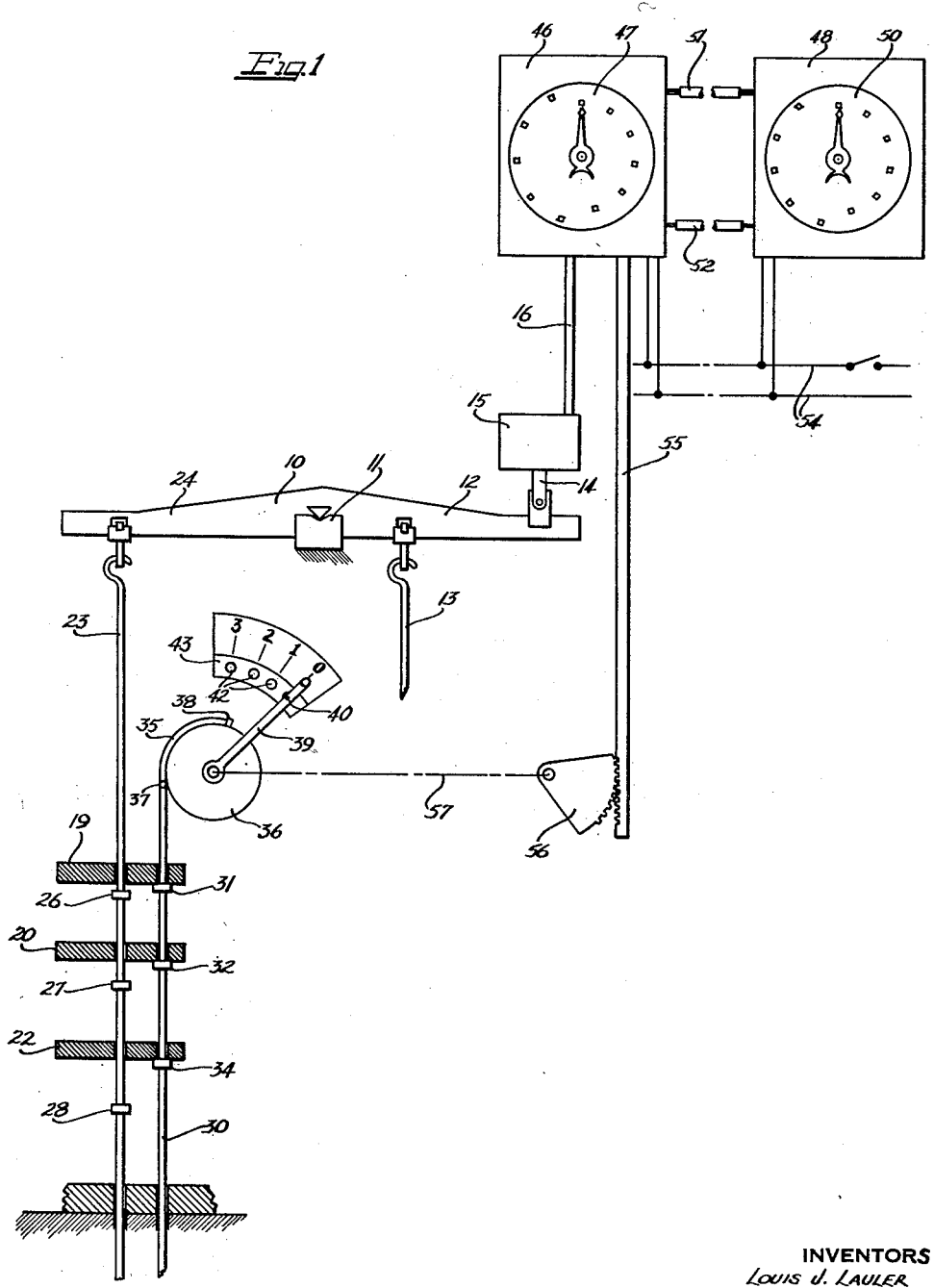

As hereinbefore expressed, the present remote indicator system is especially suitable for application to variable capacity scales, as a conventional drop-weight, pendulum scale or the like. An example of a scale of this character is shown by Patent 2,014,275 to Bousfield, wherein a drop-weight arrangement and controls therefor, are illustrated in connection with the beam of the scale. However, for the purpose of the present disclosure only so much of a conventional drop-weight scale is shown in Figure 1, as is believed necessary to a full understanding of the invention. Further, such portion of the scale is shown in partly schematic manner, since reference may be had to said patent for details of structure.

Referring to Fig. 1, the scale beam 10 is pivotally supported intermediate its ends, as at 11, and has suitably connected to the beam arm 12 and relatively near the bearing support 11, the upper end of a steelyard 13 extending to operated connection with the usual scale platform lever system (not shown). The beam output to the indicator system includes a rod 14 pivoted to the beam arm 12 outwardly beyond the point of steelyard connection thereto, and extending to operating connection with suitable balancing mechanism such as a pendulum device of well known character here indicated by the block 15, and a bar 16 (later to be referred to) actuated from the device 15. For capacity adjustment of the scale, a plurality of counter-weights or drop-weights 19, 20, and 22 are provided in superposed positions relative to drop-weight rod 23 depending from the opposite beam arm 24. This rod 23 extends freely through central apertures in the weights and carries weight-support elements or collars 26, 27, and 28 respectively below the weights 19, 20, and 22. A control shaft 30 generally paralleling rod 23 and passing freely through apertures in the weights, has weight-lifting collars 31, 32, and 34 thereon, shown in supporting engagement respectively, with the weights 19, 20, and 22. The upper end of shaft 30 is connected in suitable manner at 37 to a flexible member 35 bearing on the perpihery of a rotatable disc 36 and secured thereto at its end 38. Positionment of disc 36 is controlled through an operating lever 39 having a suitable latch or spring-loaded detent 40 cooperable selectively, with detent notches or recesses 42 in a fixed member 43. The recesses are identified in sequence, by the indicia "0," "1," "2," and "3," as shown.

The drop-weight arrangement as schematically shown and now briefly described, is such that with the disc lever at the "0" notch, the weights 19, 20, and 22 rest upon the collars 31, 32, and 34 of shaft 30 in elevated positions clear of the collars 26, 27, and 28 on beam rod 23. The beam 10 is then free of drop-weights, and hence will respond to scale loading in a given range, as for example, in the range of one to a thousand pounds. Now, upon disc rotation by movement of lever 39 to the "1" notch, the shaft 30 is thereby lowered sufficiently to clear collar 31 from weight 19, with the latter then resting on collar 26 of the beam rod 23. Through the relative spacing of the collars on both members 23 and 30, as such is shown in Fig. 1, the other weights 20 and 22 remain free of the rod 23. Consequently, only the first drop-weight 19 is now effective upon the beam 10 such as to alter the scale capacity for weighing in the next higher order range, as for example, in the range of 1000 to 2000 pounds. Similarly, moving lever 39 to notch "2," lowers shaft 30 such that both weights 19 and 20 are effective upon the beam 10, with weight 22 unapplied. With the added drop-weight, the scale capacity is increased to a still higher order range, as from 2000 to 3000 pounds. Movement of lever 39 to notch "3" then serves to make all of the drop-weights 19, 20, and 22 effective on the beam, for increasing scale capacity to the range of 3000 to 4000 pounds, as in the example suggested. While only three drop-weights are shown, it will be understood that the drop-weight system may provide one, two, or any number of drop-weights.

The indicator system of the present invention is shown diagrammatically in Fig. 1, in application to the scale beam and drop-weight mechanism there illustrated. Such system provides a signal transmitter unit 46 including a dial weight indicator 47, adapted for proximate association with the scale, and a receiver unit 48 with its weight indicator 50, located remotely from the scale. The transmitter and receiver are electrically interconnected by a three-conductor cable 51 and a two-conductor cable 52 (both cables may be included in a single sheath to provide but a single cable), while each unit is energized from a common power supply circuit as indicated at 54, all as will be described in connection with the circuit diagram of Fig. 2. The action of the transmitter is scale-controlled through the bar 16, while scale-capacity adjustment of the indicators 47 and 50 is effected from the drop-weight mechanism through a rack bar 55 actuated by a gear sector 56 driven from the disc 36 as indicated by the broken-line connection 57.

Turning now to the indicator means and circuit arrangement illustrated by Fig. 2, the signal transmitter unit or device 46 (Fig. 1) provides an inductive signal generator or synchro device 60 having a stator 61 including three stator windings preferably Y-connected as shown, providing output terminals 62, 62a, and 62b, and a single rotor winding 64 in inductive relation to the stator. Rotor winding 64 is rotatably supported by a controlling element or shaft member 65 journalled in suitable bearings (not shown), the shaft being rotatably responsive to movements of the scale beam 10 as reflected through pendulum device 15 to bar 16, with such rotary response attained by an operative connection provided by shaft pinion 66 in engagement with the teeth of a rack 68 on the bar 16 (Fig. 1). The rotor winding 64 is energized from a suitable, preferably low-voltage source, as the secondary 69 of a step-down transformer 70 having its primary across the conductors 72 of a power line (the supply circuit 54 of Fig. 1) supplying suitable alternating current power. Connection is made from one end of the rotor winding through a conductor 73 to one side of transformer secondary 69, and from the opposite end of the rotor winding through the shaft 65 grounded at 74, to the grounded side 76 of transformer secondary 69.

In the receiver unit 48 is a synchro device 77 preferably identical in character to the signal generating synchro device 60, providing a stator 78 having three windings in Y-connection, and a single rotor winding 80 rotatably supported by a controlled element or shaft 81 journalled for rotation in suitable bearings (not shown). The terminals 82, 82a, and 82b of the receiver synchro stator are electrically connected with the corresponding stator winding terminals 62, 62a, and 62b of the generator synchro 60, by three conductors 84, 84a, and 84b forming the three-wire cable 51 shown in Fig. 1. With the synchro devices thus connected and the generator synchro rotor winding 64 energized, the potential at the output of the rotor winding 80 in the receiver synchro, will be at zero value when the two rotor windings are relatively displaced by 90 degrees as shown. On the other hand, angular movement of the generator rotor winding in either direction from a position of 90 degree relative displacement agreement with the position of the receiver rotor winding, results in generation of a signal voltage in the stator 61, which signal voltage is repeated in the stator 78 of the receiver synchro, to induce an error voltage in the receiver rotor winding 80 of a phase determined by the direction of displacement of the transmitter synchro rotor winding 64.

The error voltage induced in the receiver synchro rotor winding 80 is utilized in the present system, to control the operation of positive drive means for returning the receiver rotor to null position, as to a position of 90 degree relative displacement agreement with the transmitter rotor 64. Such positive drive for the receiver synchro rotor, includes a two-phase servo-motor 86 providing an induction rotor the shaft 89 of which supports a pinion 90 in mesh with a gear 92 on the shaft 81 of the receiver synchro rotor. The servo-motor further includes a main or reference field winding 93 connected by circuit leads 94 and 96 to the alternating current power line conductors 72, and a control field winding 97. Field winding 97 is energized from the output of a suitable phase sensitive electronic amplifier 98, through the leads 100 and 101. The input to the amplifier is from the rotor winding 80 of the receiving synchro, the connection from the winding being through leads 104. Power requirements of the amplifier are supplied by connection to the supply conductors 72, as shown.

Considering now the operation of the synchro system thus far described, assuming the main or reference field 93 to be energized, it will appear that upon angular displacement of the transmitter rotor winding 64 responsively to weighing deflection of the scale beam 10, the resultant transmitter signal voltage repeated in the receiver stator 78, induces an error voltage in the receiver synchro rotor winding 80. Such error voltage is then fed to the amplifier, where it is amplified and thence applied to the control field winding 97 of the servo-motor 86 to cause operation of the latter in one direction or the other, depending upon the phase of the error voltage. In either phase direction, one representing scale load application and the other decreased scale loading or load removal, the servo-motor drives the receiver synchro rotor into the indicated relative displacement agreement with the transmitter synchro rotor, at which position the error voltage becomes zero and the servo-motor ceases operation. Thus the synchro system has its receiver rotor driven by positive driving means, such that it is thereby synchronized with the transmitter rotor for attaining matching agreement therewith to the extent of the 90 degree relationship indicated. For convenience, such relative displacement or matching agreement will be referred to in the claims, as the positional agreement of the receiver rotor and its shaft element with respect to the transmitter rotor and its shaft.

It will be appreciated now, that by providing the rack and pinion connection between the scale beam responsive bar 16 and the shaft 65 of the transmitter synchro such that the connection has a predetermined drive ratio, the shaft 65 may be limited thereby to a maximum angular displacement from its position at no-load of the scale, of approximately one turn, preferably slightly less than a full turn, consequent to maximum beam deflection in weighing operations in any capacity range of the scale. The synchro system thus may be adapted for direct dial reading of scale weights, with the receiver rotor shaft 81 at the remote indicator station, as well as the transmitter rotor shaft 65, directly actuating a suitable dial pointer over a weight reading dial scale.

As shown in Fig. 2, the receiver synchro rotor shaft 81 supports in connection to its free end 105, a weight indicator element or pointer 106 overlying the forward or exposed face 108 of a dial scale member or weight chart 109 suitably mounted in fixed position. In clockwise arrangement on the dial face 108, are weight indicia numerals in ascending order, as from "0" through "900" to "000" at the end of the chart adjacent the initial "0" indicia. For a purpose to appear, the initial zero position preferably at the top zone of the dial member, is marked "000," while immediately below and in line with said indicia is an opening 110 providing a window, and in front of the first digit of each of the remaining indicia, apart from the end indicia, is a like window 112. In front of the first "0" digit of the end indicia, is a like window 113. Rearwardly adjacent the dial chart 109 and in parallel therewith, is a second or back chart 114 which is suitably mounted (not shown) for angular displacement about the axis of shaft 81. On the forward face 116 of the back chart are sets of indicia 117 each providing the numerals "1," "2," "3," "4" disposed as shown. The back chart sets of indicia are so arranged and related to the several windows 110, 112, and 113, that in an initial angular position of the back chart, none of the back chart numerals will be exposed through the windows, with the exception of the set provided for the window 113 at the end "000" indicia of the front chart, wherein the numeral "1" of the set will appear at the window to make the indicia at this zone read "1000." This is the condition of the charts for weight indication in scale operation without drop-weights, as in the first or "0" to "1000" scale range. Angular displacement of the back chart 114 from such initial position and in the counter-clockwise direction as viewed in Fig. 2, to the next effective position which is that illustrated in the figure, brings the digit "1" of the top set of indicia into view through window 110, and the digits "1" of the remaining sets except the last or end set thereof, into view through the windows 112 of the front chart. In the end window 113 appears the digit "2" of the last set. This second position of the back chart thus adjusts the dial device for weight reading in the range of "1000" to "2000" units, as pounds, thereby adapting the remote indicator for weight indication in scale operation with one drop-weight applied to the beam 10 (Fig. 1). Movement of the back chart to a next or third position for adapting the remote indicator charts to weight readings in scale operation with two drop-weights applied to the beam, serves to locate the back chart indicia such that the digits "2" thereof in all but the last set, appear in the windows 110 and 112. The digit "3" of the last set appears in the end window 113. Thus the reading range becomes "2000" to "3000" pounds. For scale operation with all three drop-weights applied, the back chart is shifted to a fourth position wherein back chart indicia digits "3" appear in the windows 110 and 112, while the digit "4" of the last set appears in the end window 113. In this case, the reading range is "3000" to "4000" pounds. Obviously, the number of digits in the back chart sets of indicia, may be greater or less, depending upon the number of drop-weights embodied in the scale to which the remote indicator system is applied. While in the example shown, all of the sets of indicia on the back chart contain the digits 1, 2, 3, and 4 in each, the digit 4 may be omitted from all but the last set which is associated with the front chart window 113, as these are not required in the instance of a three drop-weight scale.

A principal feature of the present invention resides in the novel provision now to be described, for producing the above described positional adjustments of the remote indicator back chart automatically in accordance with adjusted conditions of the scale drop-weight means. Such provision comprises an electrical network system including a balance network or bridge circuit providing a potentiometer device 120 located in the transmitter unit 46 (Fig. 1) at the scale end of the indicator system, and a like potentiometer device 121 in the receiver unit 48 at the remote station. Corresponding ends of the resistance elements 122 and 124 of the potentiometers, are connected by circuit conductor 125 which is provided at least in part, by one wire of the two-wire cable 52 (Fig. 1) between the scale and remote stations. The opposite corresponding ends of the resistance elements 122 and 124 are grounded, as at 126 and 128 respectively, thus providing a ground connection of these ends. Associated with potentiometer resistance 122 is a movable contactor 129 which is connected by a conductor 130, to the input terminal 132 of a suitable phase sensitive electronic amplifier 133 at the remote station and powered from the supply circuit 72 as shown. At least a part of said conductor 130 is provided by the other wire in the aforesaid two-wire cable 52 extending between the scale and remote stations, as shown in Fig. 1. The potentiometer resistance 124 at the remote station, has a similar movable contactor 134 associated therewith and connected by a lead 136 to the remaining input terminal 137 of the amplifier 133. The balance bridge circuit thus formed, is energized at the scale station end, as from the transformer secondary 69 supplying the rotor winding 64 of the transmitter synchro 60. For this purpose the bridge circuit conductor 125 is connected at 138, to the transformer secondary supply conductor 73, and the grounded side of the bridge circuit is ground-connected to the grounded side 76 of the secondary 69.

The potentiometer contactor 129 at the transmitter station, is operated from the rack bar 55 associated with the scale drop-weight mechanism as hereinbefore described, the operative connection including a rack element 140 fixed to bar 55 and engaging a pinion 141 on a short shaft 142 carrying the contactor 129. In the "0" position of the drop-weight control 39 (Fig. 1) wherein the drop-weights are removed from effect upon the scale beam 10, the rack bar 55 operated through the gear sector 56, is disposed in initial position such as to determine through the rack 140 and pinion 141, an initial position of the contactor 129 in engagement with the potentiometer resistance 122. A balanced condition of the bridge network, i. e. zero voltage appearing between contactors 129 and 134, then is achieved by proper positionment of the contactor 134 at the remote station potentiometer resistance 124, such contactor being movably supported on a pivot pin 144. Connecting the contactor 134 in position-controlling relation to the back chart 114 of the remote indicator dial assembly, is an operating link or bar 145 suitably pinned at 146, to the margin of the back chart. With the bridge so initially balanced, the back chart connection between the contactor 134 then in bridge balancing position, and the back chart 114 is such as to dispose the latter in its hereinbefore described initial position adapting the dial for weight reading in the first or "0" to "1000" pound range.

Upon actuation of lever 39 to position "1" (Fig. 1) whereby to effect application of the first drop-weight 19 to the scale beam 10 to increase scale capacity to the weighing range of 1000 to 2000 pounds, the resultant rotation of disc 36 drives gear sector 56 to cause longitudinal displacement of the bar 55. The latter through the rack element 140 and pinion 141, thereby changes the position of the potentiometer contactor 129 such as to unbalance the bridge network and produce a difference of potential between contactors 129 and 134 to provide a control voltage at the input terminals of the amplifier 133. The control voltage as amplified through the amplifier 133, is utilized for operating a servo-motor 148 in driving connection with the bar 145, to actuate the latter for moving the potentiometer contactor 134 in the direction to re-balance the bridge network and coincidentally therewith, to position the dial back chart 114 in its aforesaid second position adapting the indicator for weight reading in the next higher range, as from 1000 to 2000 pounds. As shown, the servo-motor provides a rotor 149 in inductive relation to a main field winding 150 and a control winding 152, and connected through a suitable gear train 153 and pinion 154, to a rack portion 156 of the bar 145. Main field 150 preferably is energized in parallel with the main field 93 of the indicator servo-motor 86, while the control field 152 is connected to the output of amplifier 133 by leads 157 and 158. The direction of rotation of the servo-motor rotor 149 is dependent upon the phase of the control voltage produced upon unbalance of the bridge network. Hence the servo-motor drive of the back chart and the contactor of the re-balancing potentiometer, is determined such that in network unbalancing consequent to movement of lever 39 in the direction to add drop-weights to the beam 10, the phase of the control voltage will be in one direction, say positive, such as to cause motor operation in the direction to shift the back chart 114 to higher order ranges, and coincidentally therewith to effect re-balancing of the network. On the other hand, movement of the lever 39 in the opposite direction toward its "0" position, as in removing drop-weights from the beam 10, results in network unbalance and resultant control voltages of opposite, or negative phase, which then causes reverse operation of the servo-motor. In this case, the drive is in the direction to re-balance the network and at the same time, to return the back chart 114 to a lower range position or to its initial position. It will be now readily appreciated that by the foregoing network system, the dial indicator chart device at the remote station is adjusted to one or another weight indicating range in exact accordance with the application and removal of drop-weights relative to the scale beam.

In the present exemplary disclosure, provision is made for weight indication at the scale end of the system, as by a pointer and chart device which may be and preferably is similar to that provided at the remote station. As shown, a dial pointer element 161 is mounted on the end of transmitter synchro rotor shaft 65 for movement over the face of a windowed front chart 162, while the back chart 164 (which with the front chart 162 may be identical in form and relation, to the remote charts 109 and 114) is connected to the bar 55 such as to be positioned in accordance with drop-weight application and removal.

A further feature of the present system is found in the provision of a control switch 165 in one of the supply circuit conductors, as the conductor 94, to the main field windings of the servo-motors at the remote station. This switch is positioned for ready manual actuation to open or closed condition at the will of the operator or observer at the remote station. The switch when closed, completes the power circuit to the main fields of the servo-motors 86 and 148, thereby conditioning them for operation in remote reading of scale load weights. Conversely, the switch in open position breaks the power supply to the servo-motor main fields, thereby preventing operation of the servo-motors, and hence, rendering the remote indicator inoperative. A principal purpose served by the switch 165, is to enable the remote station operator or observer to hold the remote indicator in an actuated condition for any desired period of time and independently of successive weighing operations at the scale station. Thus, with switch 165 closed and the scale system operated to indicate a scale load weight, the operator may then open switch 165 to hold the weight reading until an opportunity is had to observe and record the remote weight indication, or until the operator elects to observe and record the reading.

The present invention includes as still another feature thereof, an automatic, settable control for effecting at the end of a given time period, deenergization of the servo-motor main fields to retain the remote indicator in actuated, weight-indicating condition. This provision is effective only at times when the manual hold switch 165 is in open or hold position, and includes a switch circuit 166 in parallel to the switch 165, having a switch 168 therein normally urged to open position by a biasing spring 169 or the like. Carried by the switch 168 is a cam-follower 170 in roller-engagement with the periphery of a rotary cam device 172 driven by a suitable timer motor unit 173. The latter is energized from the power lines 72, as shown, with energization controlled by a manual switch 174. In the present illustration, cam device 172 provides a circular periphery 176 of uniform radius and a peripheral recess 177, while the timer motor unit 173 may be of any well known, readily available type, including a motor de-energizing limit switch or the like (not shown) effective to open the motor circuit when the cam is in its initial position illustrated in Fig. 2. The arrangement is such that so long as the follower 170 is engaged by the periphery 176 of the cam, the switch 168 will be closed, hence conditioning the servo-motors for response to weighing conditions at the scale end of the system, for actuating the remote indicator in accordance therewith. However, when the cam recess 177 approaches and attains the position of the follower, the latter enters the recess, thus permitting the switch 168 to open under its bias spring 169. At this point in the rotational travel of the cam, being its initial position as aforesaid, the remote indicator then will be in a weight indication hold condition.

Carried by the cam is a pointer 178 which is in association with a fixed time scale 180 having suitable time graduations thereon, as for example the graduations 0 to 20 in terms of minutes. The pointer is shown at the zero end of the scale 180, in which position the cam is at its initial position with the motor limit switch (not shown) open to break the motor energizing circuit. Now, upon manually turning the cam (and hence the rotor of motor 173) in the clockwise direction such as to bring the pointer opposite a desired time graduation on the scale 180, as for example that indicating 10 minutes, the switch follower 170 will be on the cam periphery 176 to effect closure of switch 168. The remote indicator system then will be conditioned for weight reading operation. Following closure of switch 174, the timer motor 173 operates to drive the cam counter-clockwise as viewed in Fig. 2, toward its initial position, attaining that position at the end of the pre-set 10 minute period. Thus, at the end of the 10 minute time period, the timer motor stops (due to opening of its limit switch), and the follower 172 then being received in the cam recess 177, the switch 168 opens the power circuit to the servo-motor fields 93 and 150. Hence, the remote indicator then holds the weight reading of whatever scale load may be then in weighing application to the scale. Consequently, by setting the cam for a desired time period, the automatic timer provision will produce at the end of the period, a hold condition of the remote indicator with the latter indicating the weight of the scale load which is then applied to the scale.

While the remote indicator system as now described and as illustrated by Figs. 1 and 2, is presented in respect to a single transmitter unit and a single remote receiver unit, it will be readily appreciated that various arrangements of a plurality of these units may be provided to accommodate various scale installation requirements. For example and with reference to Fig. 3, one transmitter unit 200 in proximate association with a variable capacity scale as shown by Figs. 1 and 2, may be adapted for and utilized to operate any one, two or all of a plurality of remote indicator units, as the three such units shown at 201, 202, and 203, which may be located at more or less widely spaced points, one relative to another. The receiver synchro devices of the remote units are coupled to the transmitter synchro device through three-wire cable 205 extending from the latter, and branch cables 206, 207, and 208 to the remote units respectively. For drop-weight adjustments of the several remote indicator units, since the two-wire cable connection between the potentiometers at the transmitter and receiver units, forms part of a balance bridge network, it is required to adapt the transmitter unit such as to provide for independent network cable connection between the potentiometer and amplifier means of each remote unit, and a separate one of a plurality of like potentiometers at the transmitter unit. Thus, the drop-weight controlled bar 55 provides for simultaneous actuation of the movable contactor elements 210, 211, and 212 of potentiometers 214, 215, and 216. Two-wire cable 218 connects the potentiometer 214 and its contactor 210 to the remote unit 201, while similar two-wire cable 219 connects the potentiometer 215 and its contactor 211 to the remote unit 202, and a like two-wire cable 220 connects the potentiometer 216 and its contactor 212 to the remote unit 203. Moreover, in the power supply circuit to each remote unit is a control switch 222, so that by closing one or more of these switches, a corresponding one or more of the remote units may be thereby conditioned for weight reading response to the transmitter unit 200.

Fig 4 illustrates another arrangement of the units, wherein a single remote indicator unit 230 is connectible selectively to any one of a number of transmitter units, as the three such units 232, 233, and 234 each in proximate association with a separate variable capacity scale. Switch 236 (shown diagrammatically only) affords connection of the remote indicator synchro device selectively to the transmitter synchro device of one or another of the transmitter units, while switch 237 (likewise shown diagrammatically only) provides for connection of the remote indicator back-chart adjusting means selectively to the drop-weight desponsive device of one or another of the transmitter units. Moreover, the two switches 236 and 237 are suitably interlocked, as indicated at 238, so that both synchro and back-chart adjusting provisions of the remote indicator unit may be coupled to but one and the same transmitter unit, in transmitter selection by the switch means.

The present remote indicator system is particularly suitable for such combinations as are exemplified by Figs. 3 and 4, because in all such instances the receiver rotor is positively driven in matching agreement with the transmitter rotor. Thus, in the embodiment according to Fig. 3, upon activation of any one or more of the receiver units 201, 202, and 203 through closure of switches 222, the receiver rotor in each unit so energized, will undergo positive drive in synchronous agreement with the rotor of the transmitter unit 200. Hence, in any angular position of the transmitter rotor, the receiver rotor of whatever receiver units are then energized, will assume the heretofore indicated 90 degree displacement agreement relative to the transmitter rotor position. In the example of Fig. 4, the same synchronous matching as described, obtains in respect to the rotor of receiver unit 230 and the transmitter rotor of whichever transmitter unit is then connected to the receiver or remote unit.

Having now described and illustrated the present invention in respect to a presently preferred embodiment thereof, what is claimed is:

1. In combination with weighing apparatus of variable capacity, providing a weight positioned member and including capacity determining means operable selectively, for changing the capacity of the weighing apparatus from one weight range to another, a weight indicating system therefor, comprising a transmitter including a controlling element movable by said weight positioned member, for developing a signal voltage upon movement of the controlling element, a receiver including a controlled element, adapted to develop an error voltage in response to said signal voltage, servo-motor means operable in response to the error voltage to drive said controlled element into positional agreement with said controlling element, an indicator element operated by said controlled element, weight indicia bearing means operatively associated with said indicator element and adjustable for arranging the weight indicia thereof in correspondence with the selected capacity of the weighing apparatus, and means including balance network means controlled by said capacity determining means, for effecting adjustments of said weight indicia means.

2. In combination with a variable capacity scale having a member positionable according to scale load weight, and including capacity determining means operable selectively, for changing the weighing capacity of the scale from one weight range to another, a weight indicator device located remotely from the scale, electrical means for translating scale loading positionment of said member to operation of said indicator device to indicate the weight of the scale load, said indicator device being adjustable to correspond weight indication thereby to the weight range of the scale as determined by said capacity determining means, and means for adjusting the indicator device, comprising an electrical network including means responsive to operation of said capacity determining means to determine the weight range of the scale, for effecting unbalance of the network, said network providing a network re-balancing device, and servomotor means responsive to network unbalance for simultaneously adjusting said indicator device and operating said re-balancing device to re-balance the network.

3. In combination with a variable capacity scale having a beam positionable in accordance with scale load weight, a counter-weight and control means operable selectively for applying and removing the counter-weight relative to the scale beam such as to adjust the scale for weighing respectively in higher and lower weight ranges; a remote indicator system comprising a controlling element angularly positionable in accordance with scale load weight positionment of the scale beam, an angularly movable controlled element at the remote end of the system, electrical means responsive to angular displacement of said controlling element and operable to cause angular displacement of said controlled element into positional agreement with the controlling element, a stationary member having indicia thereon arranged for providing a weight scale, an indicator element actuated by said controlled element and positioned for movement in weight indicating relation to said weight scale, a second indicia bearing member positionable relative to said stationary member such that in a first position thereof, said weight scale is completed by certain indicia of the second member to provide a lower weight range scale, and such that in a second position of the second member, certain other indicia of the second member cooperate with the weight scale of the stationary member to provide a higher weight range scale, and position controlling means for said second member, effective in response to operation of said counter-weight control means to remove the counter-weight from the scale beam, for actuating the second member to said first position thereof, the said position controlling means further being effective in response to operation of the counter-weight control means to apply the counter-weight to the scale beam, for actuating the said second member to its said second position.

4. The combination as defined by claim 3, wherein the said position controlling means includes a balance bridge network adapted to be unbalanced responsively to selective operation of said counter-weight control means in applying and removing the counter-weight relative to the scale beam, and means responsive to bridge unbalance for effecting simultaneously, re-balance of the bridge network and positionment of the said second indicia bearing member.

5. The combination as defined by claim 3, wherein the said position controlling means includes servo-motor means in operative connection to the said second indicia bearing member, and servo-motor operating means controlled by the said counter-weight control means.

6. The combination as defined by claim 3, wherein the said electrical means responsive to angular displacement of said controlling element and operable to cause angular displacement of said controlled element into positional agreement with the controlling element, includes a servo-motor in operative connection with the said controlled element, and means effective selectively for rendering said servo-motor operable and inoperable.

7. In combination with variable capacity weighing apparatus having control means operable for determining the weighing capacity of the apparatus selectively in lower and higher weight ranges, weight indicator means remote from the weighing apparatus, providing a stationary member having indicia thereon arranged for providing a weight scale, an indicator element movable relative to the weight scale, a second indicia bearing member positionable relative to said stationary member such that in a first position thereof, said weight scale is completed by certain indicia of the second member to provide a lower weight range scale corresponding to the lower weight range of the weighing apparatus, and such that in a second position of the second member, certain other indicia of the second member cooperate with the weight scale of the stationary member to provide a higher weight range scale corresponding to the higher weight range of the weighing apparatus, means for translating scale load weight response of the weighing apparatus to corresponding movements of said indicator element, and position controlling means for said second indicia bearing member, effective responsively to operation of said control means to determine the capacity of the weighing apparatus in the lower weight range, for actuating said second member to its said first position, said position controlling means further being effective responsively to operation of said control means to determine the capacity of the weighing apparatus in the higher weight range, for actuating the second member to its said second position.

8. The combination as defined by claim 7, wherein the controlling means includes a balance bridge network adapted to be unbalanced responsively to operation of the said control means for determining the weighing capacity of the weighing apparatus, and bridge unbalance responsive means for effecting simultaneously, re-balance of the bridge network and positionment of the said second indicia bearing member.

9. The combination as defined by claim 7, wherein the said means for translating scale load weight response of the weighing apparatus to corresponding movements of said indicator device, includes a servo-motor in operative connection with the said indicator element, and means effective selectively for rendering said servo-motor operative and inoperative.

10. In a remote indicator system for variable capacity weighing apparatus having capacity control means operable selectively, to condition the weighing apparatus for weighing in any one of a plurality of different weight ranges, a remote indicator device comprising relatively adjustable, indicia bearing members having a plurality of relatively adjusted positions in each of which the indicia thereof cooperate to form a weight scale in a range corresponding to one of the weight ranges of the weighing apparatus, an indicator element movable relative to the weight scale formed by the indicia bearing members in any relatively adjusted position thereof, means for translating load weight response of the weighing apparatus to corresponding movements of said indicator element, and electrical means under control of said capacity control means and effective in operation of the latter to condition the weighing apparatus for weighing in any selected one of said different weight ranges, for relatively adjusting said members to a position of relative adjustment wherein the indicia thereof form a weight scale in the range corresponding to the selected weight range of the weighing apparatus.

11. A remote indicator system as defined by claim 10, wherein the said means for translating load weight response of the weighing apparatus to corresponding movements of said indicator element, includes an electrical signal transmitting device operated from the weighing apparatus, and signal follow-up means proximate to the remote indicator device and terminating in operating connection to the said indicator element.

12. A remote indicator system as defined by claim 10, wherein the said electrical means includes a balance bridge network, and electric motor means controlled thereby, in operative relation to the said relatively adjustable members for effecting relative adjustments thereof.

13. In combination with weighing apparatus of variable capacity type, providing capacity determining means operable selectively, for changing the capacity of the weighing apparatus from one weight range to another, a transmitter unit for developing a signal voltage in response to operation of the weighing apparatus, a signal voltage transmission line extending from said transmitter unit, a plurality of remote weight indicator units each connected to said transmission line for weight indicating response to the signal voltage, each remote indicator unit including a multi-range weight reading scale device adjustable from one weight reading range to another, and means including electrical network means individual to the remote indicator units and the adjustable scale devices thereof, operable responsively to operation of said capacity determining means to condition the weighing apparatus for weighing in a given weight range, for effecting adjustments of said weight reading scale devices of the remote indicator units to a scale corresponding to the given weight range of the weighing apparatus.

14. The combination as defined by claim 13, wherein the said means including electrical network means individual to the remote indicator units and the adjustable scale devices thereof, includes a network control device for each network means, disposed proximately to the weighing apparatus, and a common actuator for said network control devices, operated in accordance with operation of the said capacity determining means.

15. In a remote indicator system of the character described, in combination with a plurality of weighing scales each of variable capacity type and each including means operable selectively, for determining the capacity range of the scale, a plurality of transmitter units individual to the weighing scales, each adapted for developing a signal voltage in response to operation of its associated weighing scale, a signal voltage transmission line extending from each transmitter unit, a remote indicator unit and switch means for connecting the remote unit selectively to any one of said transmission lines, for weight indicating response of the remote unit to the signal voltage of the connected transmission line, said remote indicator unit including a multi-range weight reading scale device adjustable from one weight reading range to another, electrical means in the remote unit for effecting adjustments of the scale device, said electrical means including a portion of an electrical network, each of said transmitter units having network control means operable responsively to operation of said means for determining the capacity range of the scale, the control means of each transmitter unit including in extension therefrom toward the remote unit, an electrical network portion complemental to the network portion of said remote unit, and switch means operable coincidentally with operation of the first said switch means to connect the remote indicator unit to the transmission line of a selected one of said transmitter units, for connecting the network portion of the remote unit to the complemental network portion of said selected one of the transmitter units, whereby to render the network control means of such unit effective through the connected network portions, for operating said electrical means in the remote unit to adjust said scale device to a weight range corresponding to the scale capacity range determined by said capacity determining means.

References Cited in the file of this patent

UNITED STATES PATENTS

| | | |
|---|---|---|
| 2,014,275 | Bousfield | Sept. 10, 1935 |
| 2,256,487 | Moseley et al. | Sept. 23, 1941 |
| 2,393,186 | Potter | Jan. 15, 1946 |
| 2,439,094 | Miles | Apr. 6, 1948 |
| 2,447,344 | Kliever | Aug. 17, 1948 |
| 2,653,308 | Allen | Sept. 22, 1953 |
| 2,659,066 | Sayer | Nov. 10, 1953 |

FOREIGN PATENTS

| | | |
|---|---|---|
| 368,280 | Great Britain | Feb. 22, 1932 |